United States Patent
Jessup (10) Patent No.: US 11,505,160 B2
(45) Date of Patent: Nov. 22, 2022

(54) LOCKING WEB RETRACTOR WITH CONTROLLABLE LOCK

(71) Applicant: Indiana Mills & Manufacturing, Inc., Westfield, IN (US)

(72) Inventor: Chris P. Jessup, Sheridan, IN (US)

(73) Assignee: Indiana Mills & Manufacturing, Inc., Westfield, IN (US)

(*) Notice: Subject to any disclaimer, the term of this patent is extended or adjusted under 35 U.S.C. 154(b) by 197 days.

(21) Appl. No.: 17/002,016

(22) Filed: Aug. 25, 2020

(65) Prior Publication Data

US 2021/0061221 A1 Mar. 4, 2021

Related U.S. Application Data

(60) Provisional application No. 62/891,739, filed on Aug. 26, 2019.

(51) Int. Cl.
| | |
|---|---|
| *B60R 22/343* | (2006.01) |
| *B60R 22/44* | (2006.01) |
| *B60R 22/353* | (2006.01) |

(52) U.S. Cl.
CPC .... *B60R 22/343* (2013.01); *B60R 2022/3535* (2013.01); *B60R 2022/4466* (2013.01)

(58) Field of Classification Search
CPC . B60R 22/3416; B60R 22/347; B60R 22/343; B60R 2202/4466; B60R 2202/4666; B60R 2202/3535
See application file for complete search history.

(56) References Cited

U.S. PATENT DOCUMENTS

| | | | |
|---|---|---|---|
| 4,688,825 A * | 8/1987 | Arbogast | B60R 22/41 242/376 |
| 5,538,098 A * | 7/1996 | Sparhawk | B60R 22/343 280/806 |

(Continued)

FOREIGN PATENT DOCUMENTS

| | | | |
|---|---|---|---|
| CN | 109069190 A * | 12/2018 | A61B 17/66 |
| DE | 102004049882 A1 * | 5/2006 | B60R 22/3413 |

(Continued)

OTHER PUBLICATIONS

Baumgartner et al., belt retractor, Mar. 7, 2019, EPO, DE 10 2017 215 573 A1, Machine Translation of Description (Year: 2019).*

*Primary Examiner* — James A English
(74) *Attorney, Agent, or Firm* — Barnes & Thornburg LLP (57) ABSTRACT

A locking web retractor includes a frame including spaced-apart side walls, a spool rotatably mounted between the side walls, the spool rotatable in a web take-up pay out directions, locking components operatively coupled to the spool, a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction, a magnet responsive to actuation to cause the ferromagnetic component to move from the unlocking position to the locking position to cause the locking components to prevent the spool from rotating in the web pay out direction, and means for actuating the magnet.

20 Claims, 9 Drawing Sheets

(56) References Cited

U.S. PATENT DOCUMENTS

| | | | | |
|---|---|---|---|---|
| 5,744,872 A * | 4/1998 | Cario | ................... | B60R 22/343 |
| | | | | 242/384 |
| 10,569,737 B2 * | 2/2020 | Kleinert | ................ | B60R 22/357 |
| 2009/0267339 A1 * | 10/2009 | Usoro | ................. | B60R 22/4676 |
| | | | | 280/807 |
| 2013/0256443 A1 * | 10/2013 | Elizondo | ................ | B60R 22/40 |
| | | | | 242/384 |

FOREIGN PATENT DOCUMENTS

| | | | | |
|---|---|---|---|---|
| DE | 102017215579 A1 * | 3/2019 | .............. | A61K 8/19 |
| JP | 2006036119 A * | 2/2006 | | |

\* cited by examiner

LOCKING WEB RETRACTOR WITH CONTROLLABLE LOCK

CROSS-REFERENCE TO RELATED APPLICATION

This patent application claims the benefit of and priority to U.S. Provisional Patent Application Ser. No. 62/891,739, filed Aug. 26, 2019, the disclosure of which is expressly incorporated herein by reference in its entirety.

TECHNICAL FIELD

The present disclosure relates generally to locking web retractors, and more specifically to such retractors having controllable locking apparatuses for selectively preventing pay out of web.

BACKGROUND

Locking web retractors are known, some examples of which include automatic locking retractors (ALRs) and emergency locking retractors (ELRs). Such retractors typically lock under various operating conditions to prevent movement of a web attached thereto in at least a web pay out direction.

SUMMARY

The present disclosure may comprise one or more of the features recited in the attached claims, and/or one or more of the following features and combinations thereof. In one aspect, a locking web retractor may comprise a frame including spaced-apart side walls, a spool rotatably mounted between the side walls, the spool rotatable in a web take-up direction and web a pay out direction opposite the web take-up direction, locking components operatively coupled to the spool, a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction, a magnet responsive to actuation to cause the ferromagnetic component to move from the unlocking position to the locking position to cause the locking components to prevent the spool from rotating in the web pay out direction, and means for actuating the magnet.

In another aspect, a locking web retractor may comprise a frame including spaced-apart side walls, a spool rotatably mounted between the side walls, the spool rotatable in a web take-up direction and web a pay out direction opposite the web take-up direction, locking components operatively coupled to the spool, a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction, a permanent magnet movable between first and second positions relative to the ferromagnetic component, wherein in the first position a magnetic field produced by the permanent magnet does not cause the ferromagnetic component to move from the unlocking position to the locking position and in the second position the magnetic field produced by the permanent magnet causes the ferromagnetic component to move from the unlocking position to the locking position to cause the locking components to prevent the spool from rotating in the web payout direction, a mechanical linkage operatively coupled to the permanent magnet, and a mechanical switch operatively coupled to mechanical linkage, the mechanical linkage responsive to actuation of the mechanical switch to move the permanent magnet between the first and second positions.

In a further aspect, a locking web retractor may comprise a frame including spaced-apart side walls, a spool rotatably mounted between the side walls, the spool rotatable in a take up direction and a payout direction opposite the take-up direction, locking components operatively coupled to the spool, a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction, an electromagnet responsive to electrical power supplied thereto to produce a magnetic field causing the ferromagnetic component to move from the unlocking position to the locking position thereof, and a switch operatively coupled to a source of electrical power and to the electromagnet, the switch responsive to a first actuation to supply electrical power from the source of electrical power to the electromagnet and to a second actuation to remove the electrical power from the electromagnet.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

Figure 1:
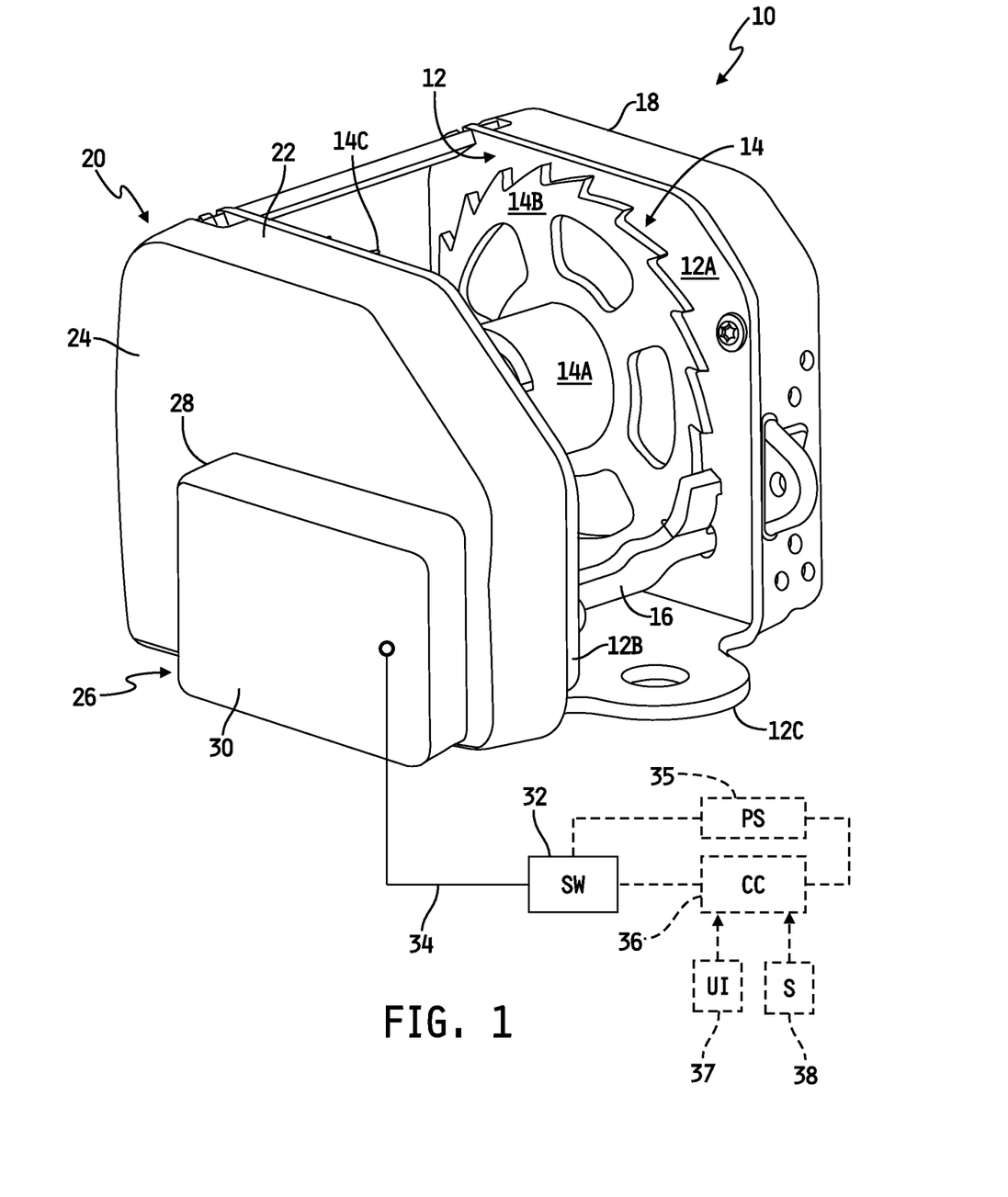
FIG. 1 is a perspective view of an embodiment of a locking web retractor with a controllable locking apparatus.

This disclosure relates to devices and techniques for controllably locking and unlocking a locking web retractor. Referring now to FIG. 1, an embodiment is shown of a locking web retractor 10 including a lock actuating module 26 for selectively actuating locking components 40 (see, e.g., FIGS. 2A and 2B) carried within a locking module 20 to lock a spool 14 of the web retractor 10 to prevent the spool 14 from rotating in a web payout direction, i.e., in a direction which pays out web wrapped around the spool 14, and to unlock the spool 14 to allow the spool 14 to rotate in the web payout direction to pay out web from the retractor 10. In the illustrated embodiment, the web retractor 10 includes a frame 12 having a pair of spaced-apart sidewalls 12A and 12B each extending away from a base 12C of the frame 12. Illustratively, the sidewalls 12A and 12B are substantially parallel with one another. In any case, a space is defined between the sidewalls 12A and 12B and a spool 14 is rotatably mounted within the space to and between the sidewalls 12A and 12B in a conventional manner such that the spool 14 is rotatable relative to the sidewalls 12A, 12B. The spool 14 illustratively includes a spindle 14A having toothed wheels 14B, 14C each mounted to a respective end of the spindle 14A. A spool shaft 14D is rigidly mounted to the spool 14 such that the shaft 14D rotates with the spindle 14A. The spool shaft 14D illustratively extends through the sidewall 12B of the frame 12 and outwardly away from the sidewall 12B into the locking module 20 (see, e.g. FIGS. 2A and 2B).

One end of a conventional flexible web (not shown) will typically be attached to the spool 14, and the web will then be wrapped around the spindle 14A in a conventional manner. A free end (not shown) of the web will generally extend from the retractor 10, and an engagement member (not shown), e.g., a hook, tongue assembly, buckle assembly or other conventional engagement member, may be attached to the free end of the web. A conventional power spring assembly 18, e.g., a power spring contained within a housing or cover, is operatively coupled to the spool 14 and to the sidewall 12A of the frame 12. The power spring assembly is configured in a conventional manner to apply, via the power spring, a rotational biasing force to the spool 14 in a web take up direction, i.e., in a direction which takes up web onto the spool 14. This rotational biasing force may illustratively be overcome, when the retractor 10 is not locked by the locking components 40 from rotating the spool 14 in the opposite, web payout direction (as will be described below), by pulling on the free end of the web with a force greater than the biasing force of the power spring to cause the spool 14 to rotate in the web payout direction so as to pay out web from the spool 14. The locking module 20 is illustratively mounted to the opposite sidewall 12B.

In the illustrated embodiment, the web retractor 10 further includes a conventional lock pawl 16 movably mounted to and between the sidewalls 12A, 12B of the frame 12. In embodiments which include it, the lock pawl 16 movable relative to the sidewalls 12A, 12B between a locked position in which the lock pawl 16 engages the toothed wheels 14A, 14B, e.g., between adjacent teeth thereof, to thereby prevent rotation of the spool 14 in the web payout direction, and an unlocked position in which the lock pawl 16 is moved away from and does not engage the toothed wheels 14A, 14B, to thereby allow the spool 14 to rotate in the web payout direction. In the embodiment illustrated in FIG. 1, one end of the lock pawl 16 extends into the locking module 20 and the locking components 40 carried within the locking module 20 engage and act on this end of the lock pawl 16 to control the lock pawl 16 between its locked and unlocked positions as will be described below to thereby prevent or allow rotation of the spool 14 in the web pay out direction. Also in the illustrated embodiment, the locking components 40 carried within the locking module 20 illustratively may further act on the spool shaft 14D extending into the module 20 to independently prevent or allow rotation of the spool 14 in the web payout direction. In this regard, the lock pawl 16 may be omitted in some alternate embodiments, and the locking components 40 carried within the locking module 20 may act solely on the spool shaft 14D to prevent or allow rotation of the spool 14 in the web payout direction. In other alternate embodiments, the lock pawl 16 may be included, and the locking components 40 and the lock pawl 16 may together act to prevent or allow rotation of the spool 14 in the web payout direction.

In the example embodiment illustrated in FIG. 1, the locking retractor 10 is illustratively provided in the form of a sealed retractor wherein the locking module 20 includes a housing 22 in which the locking components 40 are disposed, a cover 24 is affixed to an open end of the housing 22 to seal the locking components therein, a back side of the housing 22 is coupled an outer surface of the sidewall 12B of the frame 12 and seals are provided between the housing 22 and components of the retractor 10 extending therein, e.g., between the shaft 14D and the housing 22 as well as between one end of the lock pawl 16 and the housing 22. Such sealing of the locking module 20 blocks ingress of moisture and particles to the locking components 40 such that the locking components 40 are maintained functional during exposure of the retractor 10 to harsh environments such as, for example, dust, dirt and mud, and including full or partial immersion of the retractor 10 in water that may include various amounts of dirt or mud, e.g., ponds, lakes, streams, ditches, puddles, etc. Further details relating to various embodiments of such a sealed retractor are set forth in U.S. Pat. Nos. 9,902,366, 9,381,888, 9,266,497 and 9,150,190, all of which are assigned to the assignee of this disclosure and the disclosures of which are all incorporated herein by reference in their entireties. In alternate embodiments, the housing 22 may illustratively be omitted, the locking components 40 may be mounted directly to the outer surface of the sidewall 12B of the frame 12, and the cover 24 may be positioned over the locking components 40 and affixed to the outer surface of the sidewall 12B of the frame 12 to seal the locking components 40 between the sidewall 12B and the cover 24. Those skilled in the art will recognize, however, that the locking actuator concepts illustrated and described herein are not limited to sealed retractors, and may alternatively or additionally be implemented in any locking retractor which includes at least one movable component for preventing and allowing rotation of a web spool in the web payout direction, wherein the at least one movable component is made of or includes metal that is ferromagnetic or the at least one movable component can be implemented using material that is made of or includes ferromagnetic material, i.e., attracted by a magnetic field. It will be understood that implementation of the locking actuator concepts illustrated and described herein in any such locking retractor may be applied directly to such movable component(s) in order to selectively prevent and allow rotation of a web spool in the web payout direction, and that any such implementation is intended to fall within the scope of this disclosure.

In some embodiments, the locking module 20 illustratively includes one or more locking components 40 that lock rotation of the spool 14 under one or more "emergency conditions" such that the resulting locking retractor 10 is, in such embodiments, a so-called conventional emergency locking retractor or ELR. In other embodiments, the locking module 20 illustratively includes one or more locking components 40 that automatically lock rotation of the spool 14 under one or more non-emergency conditions such that the resulting locking retractor 10 is, in such embodiments, a so-called automatic locking retractor or ALR. In still other embodiments, the locking module 20 illustratively includes one or more locking components 40 that automatically lock rotation of the spool 14 under one or more non-emergency conditions and that lock rotation of the spool 14 under one or more emergency conditions such that the resulting locking retractor 10 is, in such embodiments, a combination ALR and ELR.

In the embodiment illustrated in FIG. 1, the lock actuating module 26 includes a housing 28 in which one or more actuating components 58 are disposed (for selectively causing the locking components 40 to prevent rotation of the spool 14 in the web pay out direction, wherein a back side of the housing 28 is affixed, e.g., via conventional fixation members, adhesive, or the like, to at least a portion of the outer surface of the cover 24 of the housing 22 of the lock module 20. In alternate embodiments, the housing 28 may be integral with the cover 24 such that the cover 24 and the housing 28 are of unitary construction. In any case, a cover 30 is affixed to an open end of the housing 28 over the one or more actuating components 58. In some embodiments, the cover 30 may be sealed to the open end of the housing 18 so as to seal the one or more actuating components 58 therein. In any case, the one or more actuating components 58 is/are illustratively selectively operable to actuate one or more of the locking components 40 housed within the lock module 20 to selectively lock and unlock the web retractor 10. It will be understood that the term "lock," when used herein with respect to the web retractor 10, means that the locking components 40 are made or induced to act in a manner that prevents the spool 14 from rotating in the web payout direction, e.g., by acting upon either or both of the spool shaft 14D and the lock pawl 16 as described above, while, in some embodiments, allowing the spool 14 to rotate in the web take up direction, and the term "unlock" means that the locking components 40 are made or induced to act in a manner that allows the spool 14 to rotate in the web payout direction, e.g., by applying a force to the web in the payout direction that is greater than the biasing force of the power spring contained in the power spring assembly 18, by, e.g., acting upon either or both of the spool shaft 14D and the lock pawl 16 as described above, while also allowing the spool 14 to rotate in the web take up direction. In some embodiments, the housings 22, 28 and the covers 24, 30 are formed by a moldable synthetic or semi-synthetic organic solid material such as a polymer or similar material, although this disclosure contemplates that the housings 22, 28 and the covers 24, 30 may be alternatively formed of one or more additional or other materials.

The one or more actuating components 58 is/are operatively coupled to a switch 32 via a locking actuator interface 34. In some embodiments, the switch 32 is a mechanical switch that is movable manually from one position to another, and the locking actuator interface 34 is a mechanical linkage configured to move one or more of the actuating components 58 from one position to another in response to the switch 32 being actuated, e.g., moved from one position to another. In some such embodiments, the mechanical switch may include a lever or handle sized and configured to facilitate manual actuation thereof.

In other embodiments, the switch 32 may be a mechanical, electromechanical or electronic switch coupled to a source of electrical energy 35 as shown in FIG. 1 by dashed-line representation, e.g., an electrical power source, PS, in the form of a voltage and/or current source, and the locking actuator interface 34 may be an electrical interface electrically connecting the switch 32 to the one or more actuating components 58. In this embodiment, the one or more actuating components 58 is/are activated electrically by controlling the switch 32 to an active or "on" position to supply electrical power from the power source 35 to the one or more actuating components 58 and deactivated electrically by controlling the switch 32 to an inactive or "off" position. In some such embodiments, the switch 32 may be a manual switch that is manually movable between the on and off positions. In some embodiments, the switch 32 may be or include an electromechanical switch, such as a solenoid or other conventional electromechanical switch.

Alternatively or additionally, the switch 32 may be electrically connected to, or be included as part of, a control circuit 36 as also shown in FIG. 1 by dashed-line representation. In some such embodiments, the control circuit 36 may be electrically connected to the power source 35, or the control circuit 36 may instead be coupled to a different source of electrical power. In any case, the control circuit 36, in embodiments which include it, may be controlled to activate/deactivate the one or more actuating components 58 in response to a manual input, e.g., an input initiated by a person, and/or the control circuit 36 may be programmed to control activation/deactivation of the one or more actuating components 58 automatically, i.e., in response to a manual and/or electrically controlled or generated signal. In the latter case, the control circuit 36 may include a conventional processor and a conventional memory circuit having instructions stored therein that are executable by the processor to control activation/deactivation of the one or more actuating components in accordance therewith. In some such embodiments, such instructions may act on input(s) provided by a user interface 37 as shown in FIG. 1 by dashed-line representation. Alternatively or additionally, such instructions may act on input(s) provided by one or more sensors or sensing systems 38 as also shown in FIG. 1 by dashed-line representation. An example of such one or more sensors or sensing systems 38 may include, but is not limited to, a weight or pressure sensor configured to produce at least one signal indicative of the weight or weight range of a person seated in a motor vehicle seat having a restraint system of which the web retractor 10 is a part. Other examples will occur to those skilled in the art, and it will be understood that any such other sensors or sensing systems are intended to fall within the scope of this disclosure.

Figure 2A:
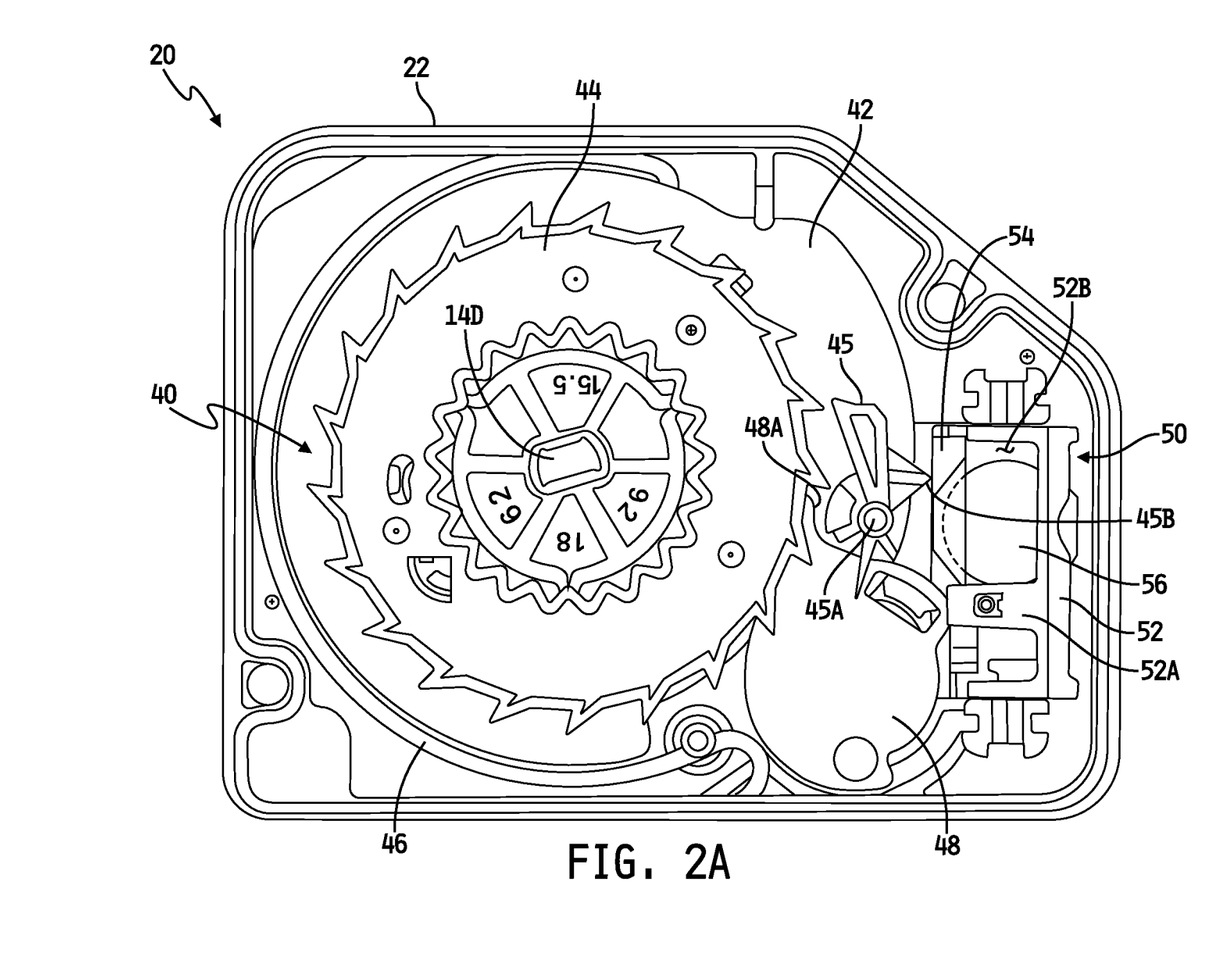
FIG. 2A is a front elevational view of an embodiment of locking components carried in the locking component housing illustrated in FIG. 1 with the locking components shown in an unlocked state.
Figure 2B:
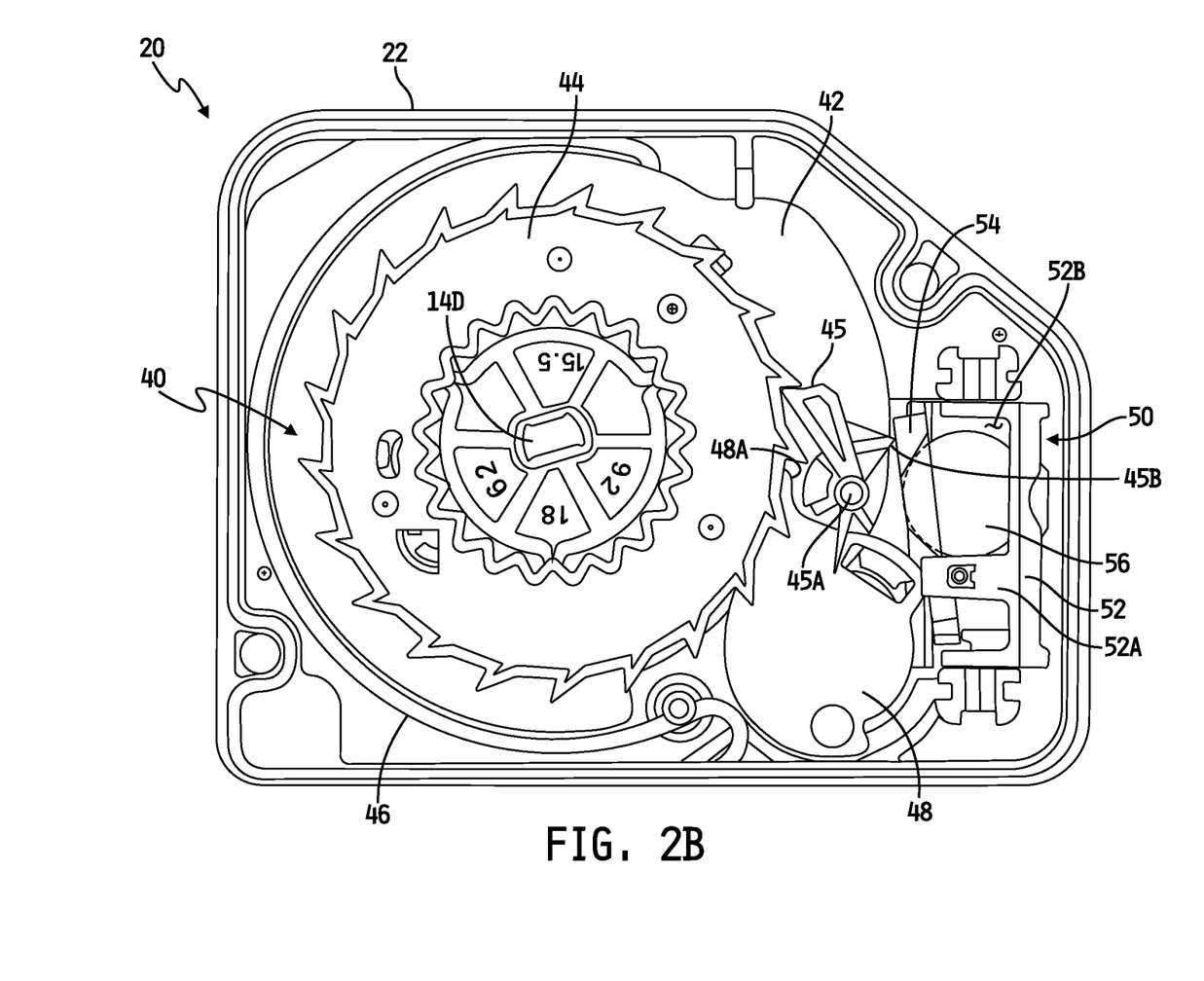
FIG. 2B is a front elevational view similar to FIG. 2A but with the locking components shown in a locked state.
Figure 3:
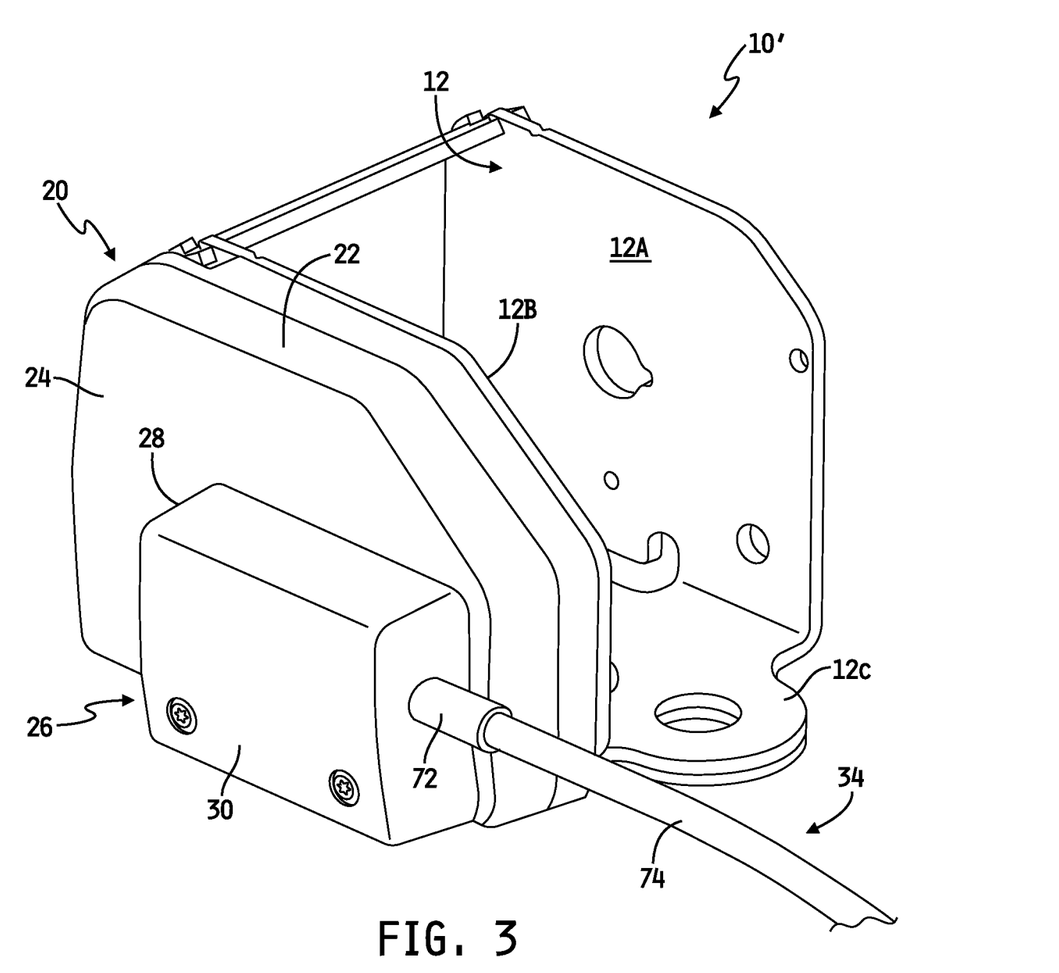
FIG. 3 is a perspective view of an example embodiment of the locking web retractor of FIGS. 1-2B including a mechanically controllable locking apparatus.

Referring now to FIGS. 2A and 2B, an embodiment of the locking components 40 carried within the housing 22 is shown, wherein the locking components 40 illustrated in FIG. 2A are in an unlocked state corresponding to the unlocked state of the web retractor 10 and the locking components 40 illustrated in FIG. 2B are in a locked state corresponding to the locked state of the web retractor 10. In the illustrated embodiment, the locking components 40 illustratively include a locking plate 42 through which the spool shaft 14D centrally passes, a toothed clutch plate 44 operatively mounted to the locking plate 42 and defining a slot centrally therethrough sized and configured to receive the spool shaft 14D therein such that the clutch plate 44 rotates with the spool shaft 14D relative to the locking plate 42 which generally remains stationary when the retractor 10 is unlocked. One end of a biasing member 46, e.g., a spring in the form of a single wire, is coupled to an underside of the locking plate 42. The body of the wire 46 is fitted into a channel formed in the underside of the locking plate 46, and the hooked opposite end of the biasing member 46 engages, e.g., is looped about, a protrusion extending from the housing 22. An underside of a lock pawl engagement member 48 defines a slot that is sized and configured to receive therein the end of the lock pawl 16 that extends into the housing 22 in embodiments which include the lock pawl 16. The lock pawl engagement member 48 also defines a lobe 48A configured to engage a post defined on the locking plate 42 such that movement of the post causes the locking bar engagement member 48 to rotate relative to the housing 22 and thereby move the lock pawl 16 into and out of its locked and unlocked positions. In embodiments which do not include the lock pawl 16, the lock pawl engagement member 48 may be omitted. Another lock pawl 45 is rotatably mounted to a top surface of the locking plate 42, and is pivotable about a mounting post 45A relative to the locking plate 42. The lock pawl 45 is normally biased away from the toothed clutch plate 44, as illustrated by example in FIG. 2A A locking actuator 50 is disposed within the housing 22 and includes a frame 52 positioned within the housing 22 so as to remain stationary therein. A lower wall 52A of the frame 52 is pivotally coupled to an actuating arm 54. The actuating arm 54 is pivotable about the free end of the lower wall 52A toward and away from a space 52B defined between the actuating arm 54 and an opposite wall of the frame 52, and also toward and away from an actuating lobe or ear 45B extending away from the lock pawl 45. The space 52B is sized to receive a ball 56 therein, wherein the ball 56 is illustratively configured to actuate the lock pawl 45 under certain inertial conditions. In the illustrated embodiment of the web retractor 10, the ball 56 is illustratively formed of 400 series steel and is therefore ferromagnetic. In alternate embodiments, the ball 56 may be formed of any one or more conventional materials so long as the resulting ball 56 is sufficiently ferromagnetic to operate in response to a magnetic field applied thereto as described below with respect to FIGS. 4A-5B.

During non-locking conditions of the retractor 10 as illustrated in FIG. 2A, the lock pawl 45 is biased away from the teeth of the clutch plate 44 as described above, and in the biased state of the lock pawl 45 the lobe or ear 45B extending away from the lock pawl 45 engages the actuating arm 54 of the frame 52 so as to maintain the actuating arm pivoted toward the space 52B as described above. In its normal, biased position, the lock pawl 45, via the lobe or ear 45B, biases the actuating arm 54 toward the opposite wall of the frame 52 of the locking actuator 50. During such non-locking conditions with the lock pawl 45 biased away from the teeth of the clutch plate 44, the clutch plate 44 rotates with the shaft 14D of the spool 14. Under such conditions, the biasing member 46 positions the post defined on the locking plate 42 to act on the lobe 48A of the locking bar engagement member 48 in a manner which causes the locking bar engagement member 48 to position the lock pawl 16 away from the teeth of the gears or wheels 14A, 14B of the spool 14 so that the spool 14 may rotate in the web payout direction such that web may be paid out therefrom, and may also rotate in the web take up direction such that the web may be taken up on the spool 14.

During certain locking conditions of the retractor 10, e.g., gravity-based and inertial-based locking conditions, the ball 56 moves, in response thereto, against and forces the actuating arm 54 of the locking actuator 50 against the lobe or ear 45B of the lock pawl 45 which, in turn, forces the lock pawl 45 into contact with the clutch plate 44 as illustrated in FIG. 2B. Rotation of the spool shaft 14D in the web payout direction under such conditions brings one of the teeth of the clutch plate 44 into contact with the lock pawl 45, thereby blocking and preventing further rotation of the clutch plate 44 and locking the clutch plate 44 to the locking plate 42. Further rotation of the spool shaft 14D in the web payout direction applies a rotational force to the combination of the clutch plate 44 and the locking plate 42 in the counterclockwise direction against the biasing member 46. When this rotational force is greater than the biasing force of the biasing member 46, the resulting rotational movement of the combination of the clutch plate 44 and the locking plate 42 in the counterclockwise direction causes the post on the underside of the locking plate 42 to act against and rotate the lobe or arm 48A of the locking bar engagement member 48 in the counterclockwise direction. This movement of the locking bar engagement member 48, in turn, rotates the lock pawl 16 into engagement with the toothed wheels 14A, 14B of the spool 14 to thereby prevent the spool 14 from rotating in the web payout direction. In alternate embodiments of the retractor 10 that do not include the lock pawl 16, the locking bar engagement member 48 may be omitted and the locking plate 42 may be rigidly affixed to the housing 22 such that movement of the ball 56 forces the actuating arm 54 of the locking actuator 50 against the lock pawl 45 which solely prevents the spool 14 from rotating in the web payout direction during locking conditions of the web retractor 10. In other alternate embodiments of the retractor 10 in which the lock pawl 16 alone is to prevent the spool 14 from rotating in the web payout direction during locking conditions of the web retractor 10, the locking components 40 may be modified such that the actuating arm 52B of the locking actuator 50 acts directly or indirectly against the locking bar engagement member 48 to move the locking bar engagement member 48 in a manner that rotates the lock pawl 16 into engagement with the toothed wheels 14A, 14B of the spool 14 to thereby prevent the spool 14 from rotating in the web payout direction.

In any case, when non-locking conditions return, e.g., the gravity or inertial-based event has subsided, the biased lock pawl 45 forces the actuating arm 54 against the ball 56 and back toward the space 52B which draws the lock pawl 45 away from the teeth of the clutch plate 44 to allow the clutch plate 44 to again rotate with the shaft 14D of the spool 14 as described above. This, in turn, allows the biasing member 46 to return the locking plate 42 to return to a non-locking position in which the post on the bottom side of the locking plate 42 acts against and rotates the lobe or arm 48A of the locking bar engagement member 48 back in the clockwise direction which, in turn, rotates the lock pawl 16 away from the toothed wheels 14A, 14B of the spool 14 to thereby again allow the spool 14 to rotate in the web payout and take-up directions.

Referring now to FIGS. 3-5B, an example embodiment 10' is shown of the web retractor 10 illustrated in FIG. 1 in which the switch 32 is a mechanical switch that is manually movable from one position to another, and the locking actuator interface 34 is a mechanical linkage illustratively provided in the form of a conventional mechanical control cable 34' configured to move one or more of the actuating components 58 from one position to another in response to the switch 32 being moved from one position to another. In the illustrated embodiment, the actuating components 58 mounted in the housing 28 of the lock actuating module 26 include a sliding magnet carrier 60 slidably mounted to the bottom wall 28A of the housing 28. The bottom wall 28A of the housing 28 illustratively defines an opening 28B therethrough, and the carrier 60 defines a central body 62 sized to be received in and project at least partially through the opening 28B as best illustrated in FIG. 4A. The central body 62 is flanked by upper and lower wings 64A, 64B configured to ride along the bottom wall 28A of the housing 28 on the top and bottom respectively of the opening 28B as the carrier 60 slides fore and aft within the housing 28 relative to the opening 28B. The exposed surface of the central body 62 projecting into the opening 28B defines a pocket or channel 62A sized to receive a permanent magnet 80 therein. A magnetized face 82 of the permanent magnet 80 faces the outer surface of the cover 24 of the lock module 20. In some embodiments, the opening 28B is open to the compartment defined between the housing 22 and the cover 24, i.e., the compartment in which the locking components 40 reside, although in other embodiments the compartment defined between the housing 22 and the cover 24 remains sealed and the opening 28B faces the outer surface of the cover 24. In any case, the housing 28 is illustratively positioned relative to the housing 22, more specifically, relative to the components contained within the housing 22, so as to position the permanent magnet 80 in operative relationship relative to the ferromagnetic ball 56 as described in detail below.

An opposite surface of the carrier 60, i.e., opposite the central body 62, illustratively defines another pocket 66 sized to receive and retain therein a head 68 of an inner cable 70 of the mechanical control cable 34'. An end fitting 72 of the control cable 34' is secured to the housing 28 and a stationary sheath 74 is coupled to the end fitting 72. Via control of the mechanical switch 32, e.g., in the form of a mechanical lever or the like, the position of the head 68 of the inner cable 70 relative to the end fitting 72 and sheath 74 may be varied relative to the housing 28 in a conventional manner to control the position of the sliding magnet carrier 60, and thus the position of the permanent magnet 80, relative to the opening 28B defined through the bottom surface of the housing 28, and thus relative to the position of the ferromagnetic ball 56 positioned within the housing 22 as described above with respect to FIGS. 2A and 2B.

Figure 4A:
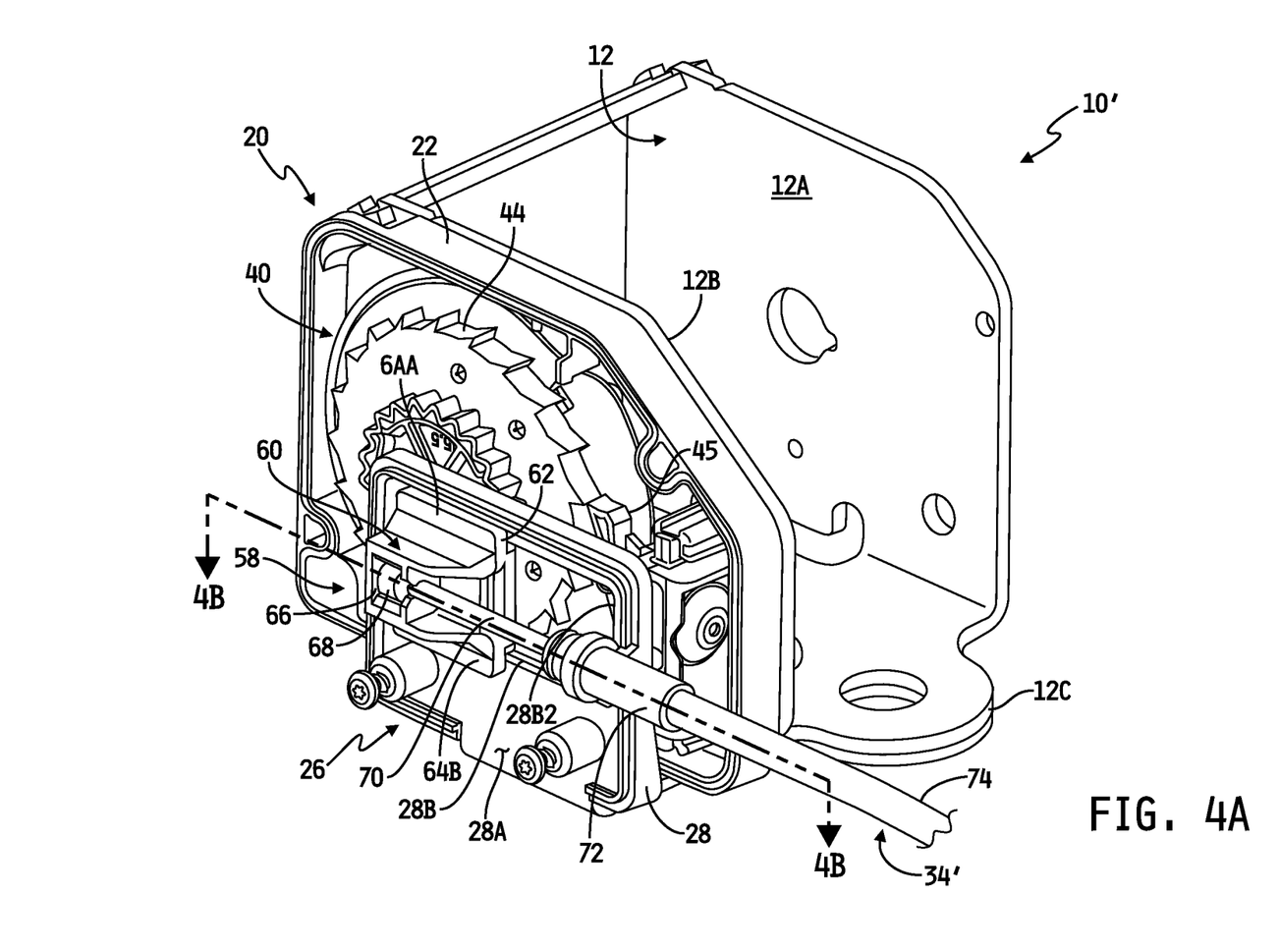
FIG. 4A is a perspective view similar to FIG. 3 but with the housing covers removed and showing the mechanically controllable locking apparatus in an unlocked position or state.
Figure 4B:
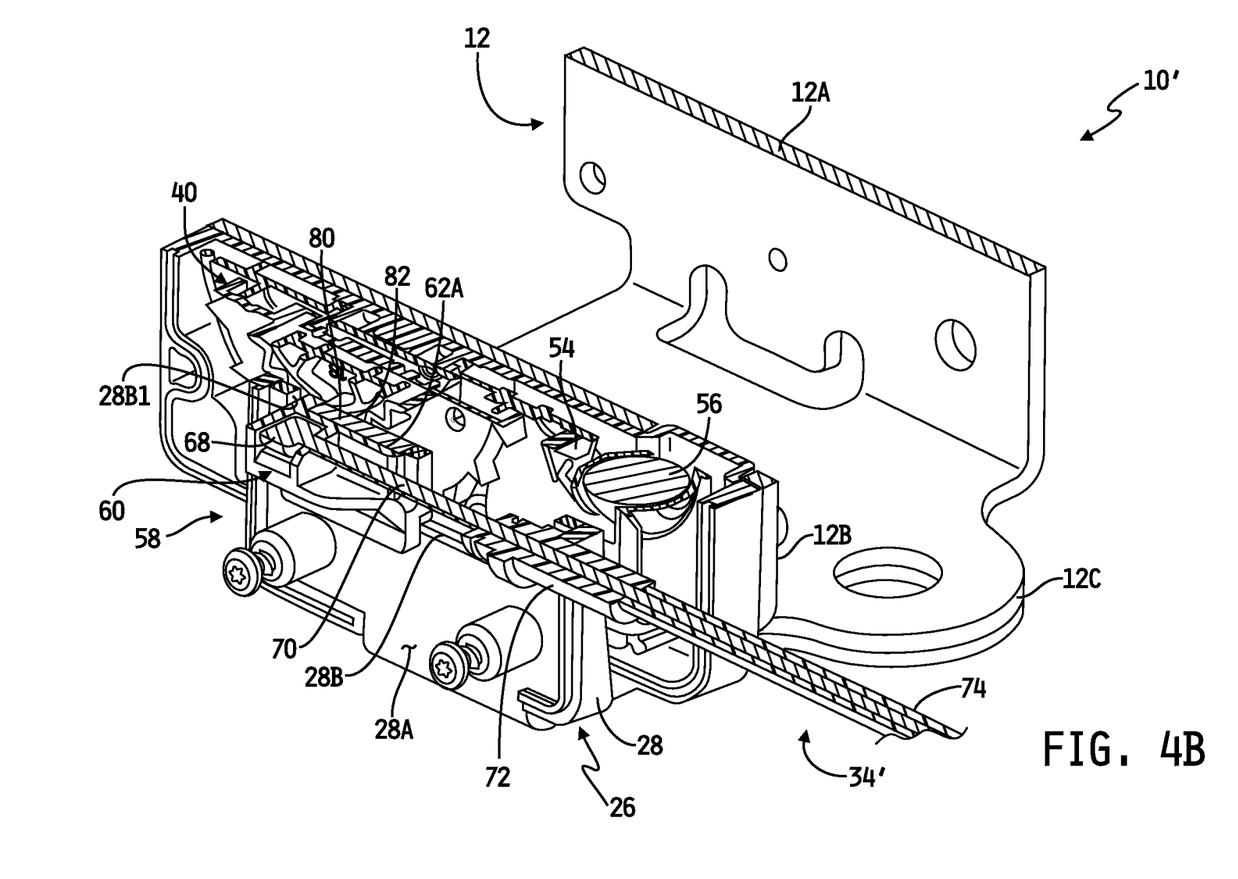
FIG. 4B is a cross-sectional view of the locking web retractor of FIG. 4A as viewed along section lines 4B-4B thereof.

In the illustrated embodiment, the switch 32 (see FIG. 1) is movable to an unlocking position in which the head 68 of the inner cable 70 extends outwardly away from the fitting 72 and the sheath 74 to cause the sliding magnet carrier 60 to slide along the opening 28B to position the sliding magnet carrier 60 at or adjacent to a distal wall 28B1 of the opening 28B as illustrated by example in FIG. 4A. In this position, the face 82 of the permanent magnet 80 is sufficiently remote from the ferromagnetic ball 56 that the magnetic force of the magnetic field produced by the permanent magnet 80 the ball 56 is too weak to draw the ball 56 into the actuating arm 54 sufficiently to cause the actuating arm 54 to move the lock pawl 45 into engagement with the clutch plate 44, as illustrated by example in FIGS. 4A and 4B. Consequently, the web retractor 10' remains in its unlocked condition or state in which the lock pawl 45 is biased away from the teeth of the clutch plate 44 and the biased pawl 45, in turn, biases the actuating arm 54 toward the opposite wall of the frame 52 of the locking actuator 50, as illustrated by example in FIG. 2A. During such non-locking conditions, the spool 14 may rotate in the web payout direction such that web may be paid out therefrom, and may also rotate in the web take up direction such that the web may be taken up on the spool 14.

Figure 5A:
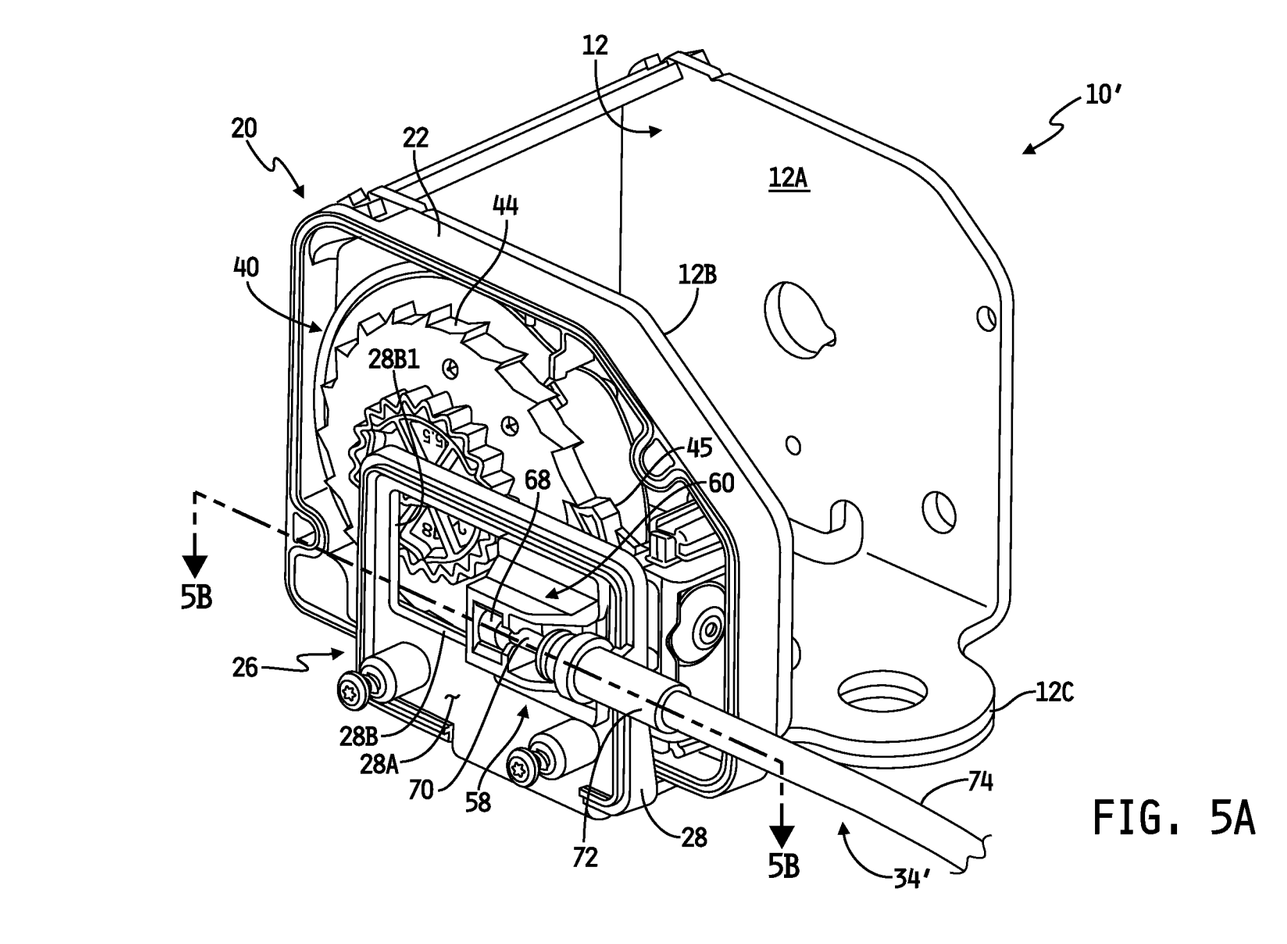
FIG. 5A is a perspective view similar to FIG. 4A but showing the mechanically controllable locking apparatus moved to a locked position or state.
Figure 5B:
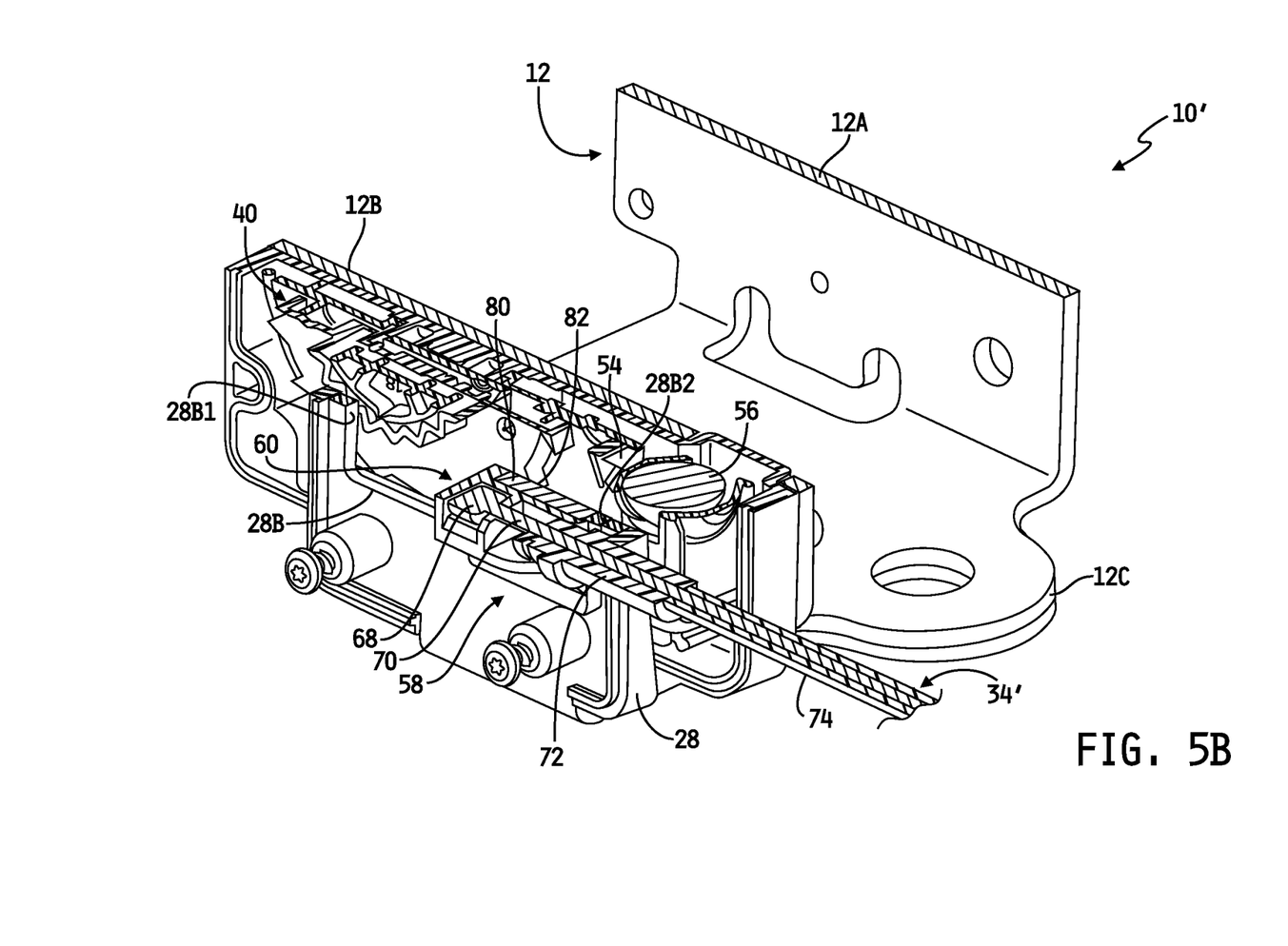
FIG. 5B is a cross-sectional view of the locking web retractor of FIG. 5A as viewed along section lines 5B-5B thereof.

The switch 32 (see FIG. 1) is further movable to a locking position in which the head 68 of the inner cable 70 is drawn towards the fitting 72 and into the sheath 74 to cause the sliding magnet carrier 60 slide along the opening 28B to position the sliding magnet carrier 60 at or adjacent to a proximal wall 28B2 of the opening 28B as illustrated by example in FIG. 5A. In this position, the face 82 of the permanent magnet 80 is sufficiently close to the ferromagnetic ball 56 that the force of the magnetic field produced by the magnet 80 draws the ball 56 into the actuating arm 54 sufficiently to cause the actuating arm 54 to move the lock pawl 45 into engagement with the clutch plate 44, as illustrated by example in FIGS. 5A and 5B. Consequently, the web retractor 10' is moved thereby to the locked condition or state in which rotation of the spool shaft 14D in the web payout direction brings one of the teeth of the clutch plate 44 into contact with the lock pawl 45, thereby blocking and preventing further rotation of the clutch plate 44 and locking the clutch plate 44 to the locking plate 42, and wherein further rotation of the spool shaft 14D in the web payout direction applies a rotational force to the combination of the clutch plate 44 and the locking plate 42 in the counterclockwise direction against the biasing member 46 which, when greater than the biasing force of the biasing member 46, causes the locking plate 42 to rotate the lobe or arm 48A of the locking bar engagement member 48 which, in turn, rotates the lock pawl 16 into engagement with the toothed wheels 14A, 14B of the spool 14 to thereby prevent the spool 14 from rotating in the web payout direction.

Figure 6:
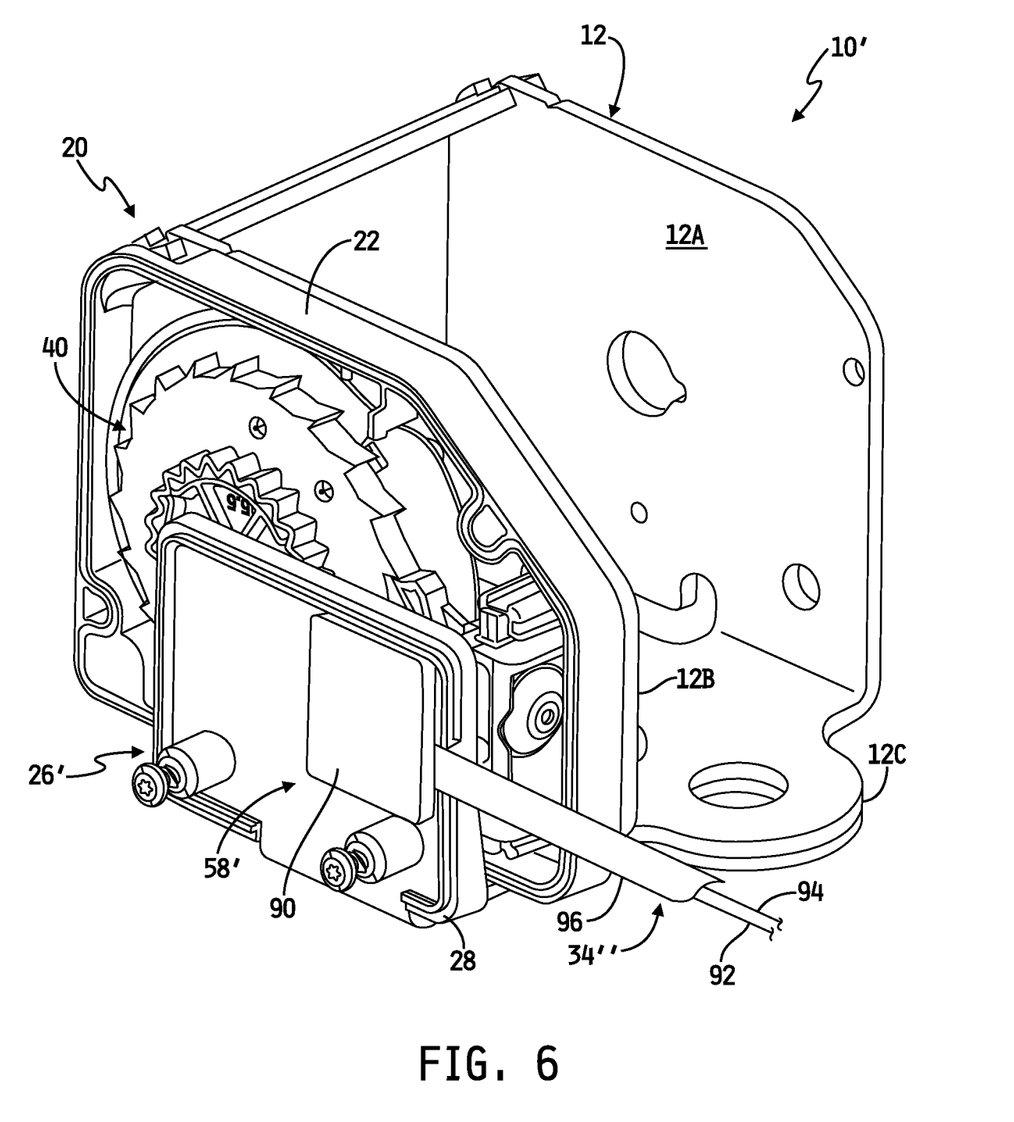
FIG. 6 is a perspective view of another example embodiment of the locking web retractor of FIGS. 1-2B having an electrically controllable locking apparatus.

Referring now to FIG. 6, another example embodiment 10" is shown of the web retractor 10 illustrated in FIG. 1 in which the switch 32 may be a mechanical or electronic switch (e.g., a stand-alone electronic switch or included as part of the control circuit 36 in embodiments which include it) coupled to an electrical power source 35, and the locking actuator interface 34 may be an electrical interface 34" electrically connecting the switch 32 to the one or more actuating components 58. In this embodiment, the one or more actuating components 58' housed within the lock actuating module 26' is provided in the form of at least one conventional electromagnet 90, i.e., a magnet structure which generates a magnetic field only when electrical power is applied thereto and which does not generate a magnetic field when the electrical power is removed or withdrawn. The electromagnet 90 is illustratively fixed in approximately the same position as the permanent magnet 80 in the locked position of the web retractor 10' (see FIGS. 5A and 5B). The electrical interface 34" illustratively includes at least one electrical conductor electrically connected between the electromagnet 90 and the switch 32. In the illustrated embodiment, the at least one electrical conductor includes two electrical conductors 92, 94, e.g., electrically conductive wires, insulated from one another within an electrically insulating sheath 96.

The electromagnet 90 is electrically activated (to generate a magnetic field) by controlling the switch 32 to an active or "on" position to supply electrical power from the power source 35 to the electromagnet 90, and is electrically deactivated (to cease generating the magnetic field) by controlling the switch 32 to an inactive or "off" position. In some such embodiments, the switch 32 may be a manual switch that is manually movable between the on and off positions. When electrically activated, the magnetic field generated by the electromagnet 90 draws the ferromagnetic ball 56 into the actuating arm 54 sufficiently to cause the actuating arm 54 to move the lock pawl 45 into engagement with the clutch plate 44 thereby causing the web retractor 10" to be in the locked condition or state in which rotation of the spool 14 in the web payout direction is prevented, as described above. When electrically deactivated, the electromagnet 90 does not generate or produce a magnetic field and the lock pawl 45, normally biased away from the teeth of the clutch plate 44, biases the actuating arm 52B toward the opposite wall of the frame 52 of the locking actuator 50 such that the spool 14 may rotate in the web payout direction to pay out the web may be paid out therefrom, as also described above.

It will be understood that in either of the embodiments 10', 10" of the web retractor illustrated in FIGS. 3-5B and 6 respectively, whereas the magnet 80, 90 may be controlled as described above to selectively lock and unlock the respective web retractor 10', 10", the web retractors 10', 10" remain lockable in a conventional manner under normal operating conditions, e.g., gravity-based and inertial-based locking conditions, and similarly remain conventionally unlockable under normal static and quasi-static operating conditions. In this regard, in some embodiments which include the control circuit 36 and the electromagnet 90, the control circuit 36 may be programmed to "pre-arm" the locking components 40 of the web retractor 10" by controllably activating the electromagnet 90 in a manner which draws the ferromagnetic ball 56 to a position that is somewhere between the position in which the actuating arm 54 is fully biased by the lock pawl 45 to the closed position illustrated in FIG. 2A and a position in which the ball 56 moves the actuating arm 54 outwardly toward (and against) the lock pawl 45 but does not cause the lock pawl 45 to engage the toothed clutch plate 44. In one embodiment, the control circuit 36 may be so programmed to pre-arm the locking components 40 of the web retractor 10" by controlling the switch 32, or otherwise controlling electrical power supplied to the electromagnet 90, to switch the electromagnet 90 between the activated and deactivated states thereof with at least one of a selected frequency, duty cycle and electrical power magnitude.

It will be further understood that by suitably controlling the frequency, duty cycle and/or magnitude of the electrical power supplied to the electromagnet 90, various different "pre-armed" positions of the ferromagnetic ball 56 relative to the actuating arm 54 may be achieved, and various different pre-armed positions of the lock pawl 45 relative to the toothed clutch plate 44 may therefore be achieved. This feature may be particularly advantageous when coupled with signals provided by the user interface 37 and/or one or more sensors 38 to selectively pre-arm the ferromagnetic ball 56 to any of multiple possible pre-armed positions thereof. As one non-limiting example in which the web retractor 10" is implemented as part of an occupant restraint system for a motor vehicle seat, and which includes a sensor 38 in the form of a weight or pressure sensor operatively coupled to the seat, the control circuit 36 may illustratively be programmed to control the pre-armed position of the ferromagnetic ball 56, e.g., via control of one or more of the frequency, duty cycle and/or magnitude of the electrical power supplied to the electromagnet 90, based on the measured or computed weight of an occupant of the seat. In one embodiment of this example, the pre-armed position of the ball 56 may be so controlled in a manner which moves the lock pawl 45 closer to the toothed clutch plate 44 with decreasing occupant weight. Thus, as occupant weight decreases, so too will the response time to move the ball 56 into the locked position in which the lock pawl 45 comes into contact with the toothed clutch plate 44. The locking web retractor 10" may therefore be made to selectively lock more quickly for lighter passengers, e.g., children, than for heavier passengers. In other embodiments, the pre-armed position of the ball 56 may be controlled in a manner which moves the lock pawl 45 based on one or more alternative or additional occupant weight-based criteria.

As another non-limiting example in which the web retractor 10" is implemented as part of an occupant restraint system for a motor vehicle seat, and which includes the user interface 37, the control circuit 36 may illustratively be programmed to control the pre-armed position of the ferromagnetic ball 56, e.g., via control of one or more of the frequency, duty cycle and/or magnitude of the electrical power supplied to the electromagnet 90, based user input of a weight or weight range of an occupant of the vehicle seat. The pre-armed position of the ball 56 may be controlled in a manner which moves the lock pawl 45 based on one or more occupant weight-based criteria.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. A locking web retractor, comprising:
   a frame including spaced-apart side walls,
   a spool rotatably mounted between the side walls, the spool rotatable in a web take-up direction and a web pay out direction opposite the web take-up direction,
   locking components operatively coupled to the spool,
   a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction,
   a magnet responsive to actuation to cause the ferromagnetic component to move from the unlocking position to the locking position to cause the locking components to prevent the spool from rotating in the web pay out direction, and
   means for actuating the magnet.

2. The locking web retractor of claim 1, wherein the magnet comprises a permanent magnet movable between first and second positions relative to the ferromagnetic component,
   wherein in the first position a magnetic field produced by the permanent magnet does not move the ferromagnetic component from the unlocking position to the locking position and in the second position the magnetic field produced by the permanent magnet moves the ferromagnetic component from the unlocking position to the locking position,
   wherein actuation of the magnet comprises moving the permanent magnet from the first position to the second position,
   and wherein the means for actuating the magnet comprises a mechanical switch operatively coupled via a mechanical linkage to the permanent magnet, the mechanical linkage responsive to actuation of the mechanical switch to move the permanent magnet from the first position to the second position.

3. The locking web retractor of claim 2, further comprising:

a housing secured to the frame, the housing defining an opening therethrough that is open to the locking components, and a carrier slidably mounted to the housing over the opening such that the carrier is slidable between opposite walls of the opening over the locking components, wherein the permanent magnet is mounted to the carrier such that the permanent magnet slides with the carrier relative to the housing between the first and second positions.

4. The locking web retractor of claim 3, wherein the mechanical linkage is coupled between the housing and the carrier such that actuation of the mechanical switch causes the mechanical linkage to slide the carrier and the permanent magnet relative to the housing from the first position to the second position.

5. The locking web retractor of claim 2, wherein the actuation of the magnet comprises a first actuation of the magnet and the actuation of the mechanical switch comprises a first actuation of the mechanical switch, wherein the magnet is responsive to a second actuation, which moves the permanent magnet from the second position to the first position, to which the locking components are responsive to move the ferromagnetic component from the locking position to the unlocking position to cause the locking components to allow the spool to rotate in the web take-up and pay out directions, and wherein the mechanical linkage is responsive to a second actuation of the mechanical switch to move the permanent magnet from the second position to the first position.

6. The locking web retractor of claim 5, further comprising:

a housing secured to the frame, the housing defining an opening therethrough that is open to the locking components, and a carrier slidably mounted to the housing over the opening such that the carrier is slidable between opposite walls of the opening over the locking components, wherein the permanent magnet is mounted to the carrier such that the permanent magnet slides with the carrier relative to the housing between the first and second positions.

7. The locking web retractor of claim 6, wherein the mechanical linkage is coupled between the housing and the carrier such that the first actuation of the mechanical switch causes the mechanical linkage to slide the carrier and the permanent magnet relative to the housing from the first position to the second position and the second actuation of the mechanical switch causes the mechanical linkage to slide the carrier and the permanent magnet relative to the housing from the second position to the first position.

8. The locking web retractor of claim 1, wherein the magnet comprises an electromagnet, wherein actuation of the magnet comprises supplying electrical power to the electromagnet to cause the electromagnet to produce a magnetic field configured to move the ferromagnetic component from the unlocking position to the locking position thereof, and wherein the means for actuating the magnet comprises means for selectively supplying the electrical power to the electromagnet.

9. The locking web retractor of claim 8, further comprising a housing secured to the frame adjacent to the locking components, wherein the electromagnet is mounted to the housing and positioned relative to the locking components such that the magnetic field produced by the electromagnet in response to supply of the electrical power thereto causes the ferromagnetic component to move from the unlocking position to the locking position.

10. The locking web retractor of claim 8, wherein the actuation of the magnet comprises a first actuation of the magnet, wherein the magnet is responsive to a second actuation comprising removing electrical power from the electromagnet to cause the electromagnet to not produce the magnetic field, wherein, in the absence of the magnetic field, the locking components are configured to move the ferromagnetic component from the locking position to the unlocking position to cause the locking components to allow the spool to rotate in the web take-up and pay out directions, and wherein the means for actuating the magnet comprises means for selectively supplying the electrical power to the electromagnet and selectively removing the electrical power from the electromagnet.

11. A locking web retractor, comprising:

a frame including spaced-apart side walls, a spool rotatably mounted between the side walls, the spool rotatable in a web take-up direction and a web pay out direction opposite the web take-up direction, locking components operatively coupled to the spool, a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction, a permanent magnet movable between first and second positions relative to the ferromagnetic component, wherein in the first position a magnetic field produced by the permanent magnet does not cause the ferromagnetic component to move from the unlocking position to the locking position and in the second position the magnetic field produced by the permanent magnet causes the ferromagnetic component to move from the unlocking position to the locking position to cause the locking components to prevent the spool from rotating in the web payout direction, a mechanical linkage operatively coupled to the permanent magnet, and a mechanical switch operatively coupled to mechanical linkage, the mechanical linkage responsive to actuation of the mechanical switch to move the permanent magnet between the first and second positions.

12. The locking web retractor of claim 11, further comprising:

a housing secured to the frame, the housing defining an opening therethrough that is open to the locking components, and a carrier slidably mounted to the housing over the opening such that the carrier is slidable between opposite walls of the opening over the locking components, wherein the permanent magnet is mounted to the carrier such that the permanent magnet slides with the carrier relative to the housing between the first and second positions.

13. The locking web retractor of claim 12, wherein the mechanical linkage is coupled between the housing and the carrier such that actuation of the mechanical switch causes the mechanical linkage to slide the carrier and the permanent magnet relative to the housing from the first position to the second position.

14. The locking web retractor of claim 11, the actuation of the mechanical switch comprises a first actuation of the mechanical switch, and wherein the mechanical linkage is responsive to a second actuation of the mechanical switch to move the permanent magnet from the second position to the first position.

15. The locking web retractor of claim 14, further comprising:

a housing secured to the frame, the housing defining an opening therethrough that is open to the locking components, and a carrier slidably mounted to the housing over the opening such that the carrier is slidable between opposite walls of the opening over the locking components, wherein the permanent magnet is mounted to the carrier such that the permanent magnet slides with the carrier relative to the housing between the first and second positions, and wherein the mechanical linkage is coupled between the housing and the carrier such that the first actuation of the mechanical switch causes the mechanical linkage to slide the carrier and the permanent magnet relative to the housing from the first position to the second position and the second actuation of the mechanical switch causes the mechanical linkage to slide the carrier and the permanent magnet relative to the housing from the second position to the first position.

16. A locking web retractor, comprising:

a frame including spaced-apart side walls, a spool rotatably mounted between the side walls, the spool rotatable in a take up direction and a payout direction opposite the take-up direction, locking components operatively coupled to the spool, a ferromagnetic component movable relative to the locking components between an unlocking position in which the ferromagnetic component does not cause the locking components to prevent the spool from rotating in the web pay out direction and a locking position in which the ferromagnetic component causes the locking components to prevent the spool from rotating in the web pay out direction, an electromagnet responsive to electrical power supplied thereto to produce a magnetic field causing the ferromagnetic component to move from the unlocking position to the locking position thereof, and a switch operatively coupled to a source of electrical power and to the electromagnet, the switch responsive to a first actuation to supply electrical power from the source of electrical power to the electromagnet and to a second actuation to remove the electrical power from the electromagnet.

17. The locking web retractor of claim 16, wherein the switch comprises an electromechanical switch, and the first and second actuations comprise manual actuations of the electromechanical switch.

18. The locking web retractor of claim 16, wherein the switch comprises an electronic switch, and further comprising means for electronically generating the first and second actuations to control the electronic switch.

19. The locking web retractor of claim 16, wherein the switch comprises an electronic switch, and further comprising a control circuit operatively coupled to at least one of the electronic switch and the source of electrical power, the control circuit configured to generate the first and second actuations of the switch.

20. The locking web retractor of claim 19, wherein the control circuit includes the electronic switch.

* * * * *